United States Patent
Melkuti

(10) Patent No.: US 7,281,680 B2
(45) Date of Patent: Oct. 16, 2007

(54) VTOL/STOL DUCTED PROPELLER AIRCRAFT

(75) Inventor: Attila J. Melkuti, Aliso Vijeo, CA (US)

(73) Assignee: Attila Melkuti, Aliso Viejo, CA (US)

( * ) Notice: Subject to any disclaimer, the term of this patent is extended or adjusted under 35 U.S.C. 154(b) by 463 days.

(21) Appl. No.: 10/442,903

(22) Filed: May 22, 2003

(65) Prior Publication Data

US 2004/0232279 A1    Nov. 25, 2004

(51) Int. Cl.
*B64C 29/00*    (2006.01)
(52) U.S. Cl. ..................... 244/12.5; 244/12.1
(58) Field of Classification Search ............... 244/12.1, 244/12.2, 12.4, 12.5, 12.6, 23 A, 23 C, 23 D, 244/102 SS
See application file for complete search history.

(56) References Cited

U.S. PATENT DOCUMENTS 3,182,929 A * 5/1965 Lemberger ............... 244/12.2
3,826,450 A * 7/1974 Currey et al. ............ 244/103 R
5,407,150 A * 4/1995 Sadleir ..................... 244/12.4
5,454,531 A * 10/1995 Melkuti .................... 244/12.6

FOREIGN PATENT DOCUMENTS

WO    WO88/00556    * 1/1988

* cited by examiner

*Primary Examiner*—Rob Swiatek

(57)    ABSTRACT

The aircraft incorporates a single ducted propeller. The fuselage Bridges over the ducted propeller assembly, and is shaped in a way that the incoming air can smoothly flow into the propeller area. The duct has an aerodynamically shaped frontal area, and an aft extension, which forms the tail section. The wings are attached to the side of the duct. The ducted propeller assembly also contains louvers, which run span wise, to redirect the outgoing air in horizontal direction. During vertical take-off or landing, the propeller has a horizontal plane of rotation, after take-off the whole craft entirely tilts forward approximately 26 degrees to transition into horizontal wing born flight. During vertical flight, the aircraft is controlled by control louvers installed inside the ducted propeller assembly in the propeller slipstream.

7 Claims, 8 Drawing Sheets

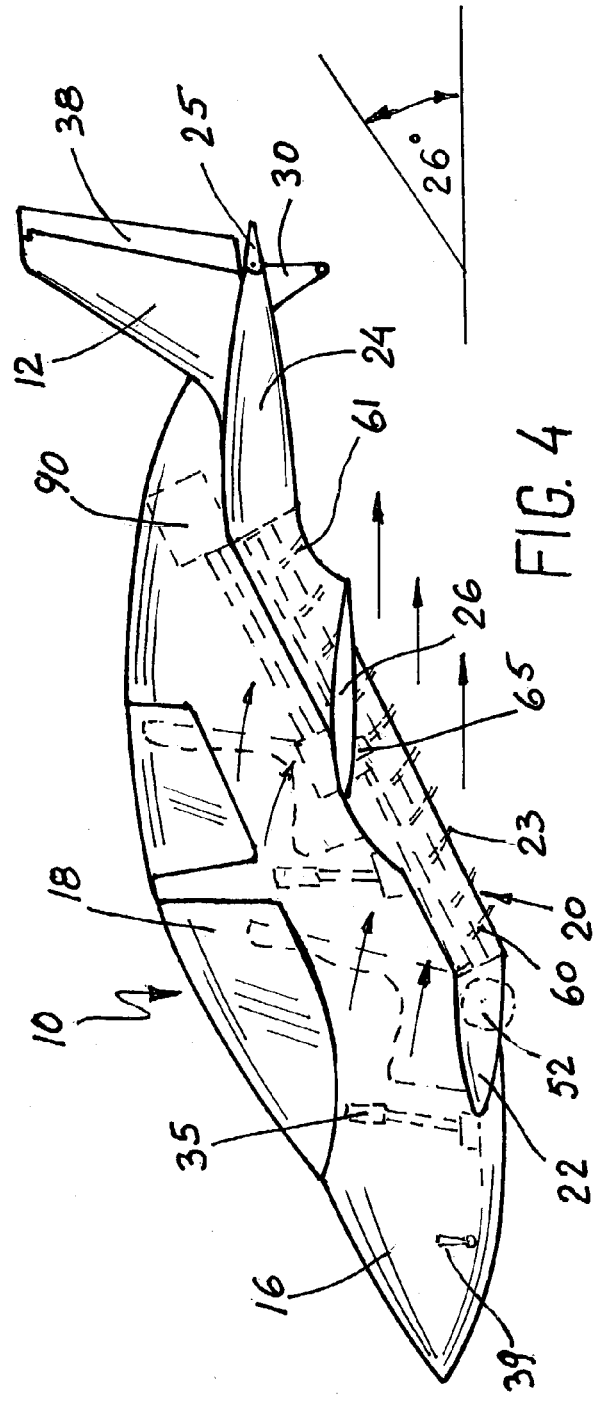
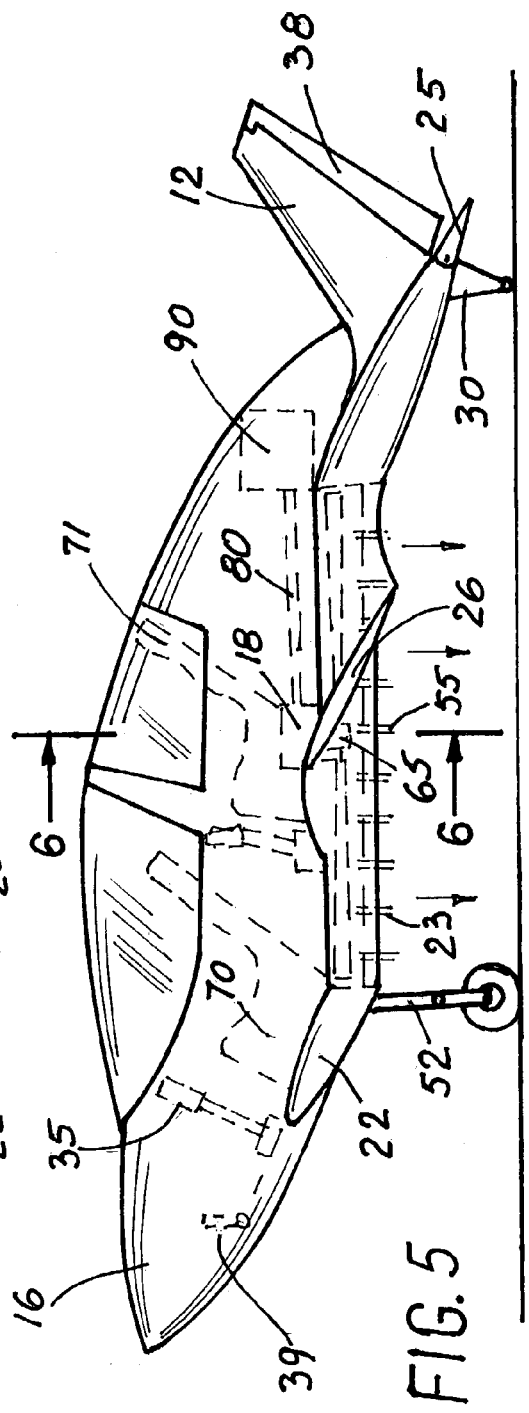
FIG. 4
FIG. 5

VTOL/STOL DUCTED PROPELLER AIRCRAFT

BACKGROUND OF THE INVENTION

The ultimate goal in designing a fixed wing VTOL aircraft is to be able to take off and land vertically and still have a smooth transition to a higher cruise speed and a relatively long range.

It also needs to have a simple and effective way of controlling the aircraft during vertical take off or landing, and in transition to horizontal flight.

My previous patent (U.S. Pat. No. 5,454,531 DUCTED PROPELLER AIRCRAFT) addresses the difficult challenge of vertical or short takeoff or landing in fixed wing aircraft with high speed cruise, with a multiple propeller configuration.

With this present invention, I am simplifying the propulsion system by using only one propeller. With the single propeller this aircraft is more efficient, it is lighter, simpler, and safer. By tilting the whole aircraft forward to produce a horizontal thrust component, and using a single propulsion system, for vertical and horizontal flight, this invention eliminates a lot of mechanical complexity, and makes it an easy transition from vertical to horizontal flight, and vice versa.

Many previous designs have included two separate power sources (one for vertical thrust and one for horizontal) (see U.S. Pat. Nos. 4,469,294; 3,083,935 and 3,388,878); ducted fans mounted in the fixed wings which rotate from horizontal to vertical (see U.S. Pat. No. 3,335,977); diverting jet engine exhaust turbo fans mounted above fixed wings and transitioning exhaust, through ducting from vertical to horizontal (see U.S. Pat. No. 3,972,490) and the numerous tilt wings and tilt engine concepts configured from the late 1930's to today.

All of these embodiments involve at least one of the three most troublesome aspects of VTOL aircraft designs. They may involve:
1) Cumbersome, and therefore heavy, mechanisms for moving massive structures such as wings or ducted fan assemblies; or
2) Sacrificing aerodynamic smoothness, thereby creating unacceptable drag; or
3) Multiple power plants or complex drive trains, thus increasing weight and lowering performance.

The goal of the present invention is to avoid all of these previously mentioned troublesome elements of S/VTOL designs while maintaining good performance during horizontal flight (high speed and long range) and efficient attitude control during hovering and transition flight, the ultimate intended configuration of all VTOL aircraft.

SUMMARY OF THE INVENTION

The exemplary embodiment of this invention involves a fixed wing airborne vehicle capable of vertical take off and landing or short take off and landing (VTOL/STOL).

Specifically, this invention relates to S/VTOL (short or vertical take off and landing) aircraft wherein a ducted propeller assembly is the sole source of thrust (which is powered by the engine) in vertical and horizontal flight. As used herein, the term aircraft includes any airborne vehicle.

In the exemplary embodiment, the aircraft of the invention utilizes a single or twin engine mechanically driving a ducted propeller, mounted in a fixed position within the airframe.

In vertical or short take off flight, roll, pitch, and yaw, are controlled by moveable louvers, and spoilers in the air stream of the ducted propeller propulsion.

After vertical take off, the whole aircraft tilts gradually forward to approximately 26 degrees and accelerates to a conventional wing born flight.

In the conventional configuration, roll, pitch, and yaw are controlled through conventional aerodynamic surface adjustments of ailerons, rudders, and elevator. The aircraft of this invention is also equipped with louvers positioned below the propeller. When the S/VTOL aircraft is tilted forward for horizontal flight, the thrust already has a significant horizontal component, but tilting or pivoting these louvers directs the thrust created by the propeller directed backward horizontally for high speed cruise. These louvers are designed to be flexible only in one direction, so when they reach the maximum tilting range, they are stopped by a stopping block, so they can be bent to the point where they form a nice arch for smooth airflow in a horizontal direction. Pressing the louvers against the stopping blocks will also prevent vibration or flutter.

The entire aircraft of this invention is shaped in a way so that the airflow can smoothly enter the ducted propeller assembly during horizontal and vertical flight and also exit the duct smoothly. This is achieved by bridging the airfoil shaped fuselage over the ducted propeller assembly, and by shaping the frontal area of the duct and the aft extension as an airfoil in a way to assume a horizontal position in horizontal flight.

BRIEF DESCRIPTION OF THE DRAWINGS

FIG. 4 is a side view with partial cutaway showing relative location and the inclination of the ducted propeller thrust/lift assembly during typical horizontal flight of the aircraft according to the invention.

FIG. 5 is a side view with partial cutaway showing the fuselage and the ducted propeller thrust/lift assembly in reference to the ground during initial stages of vertical take off.

DESCRIPTION OF THE PREFERRED EMBODIMENT

Figure 1:
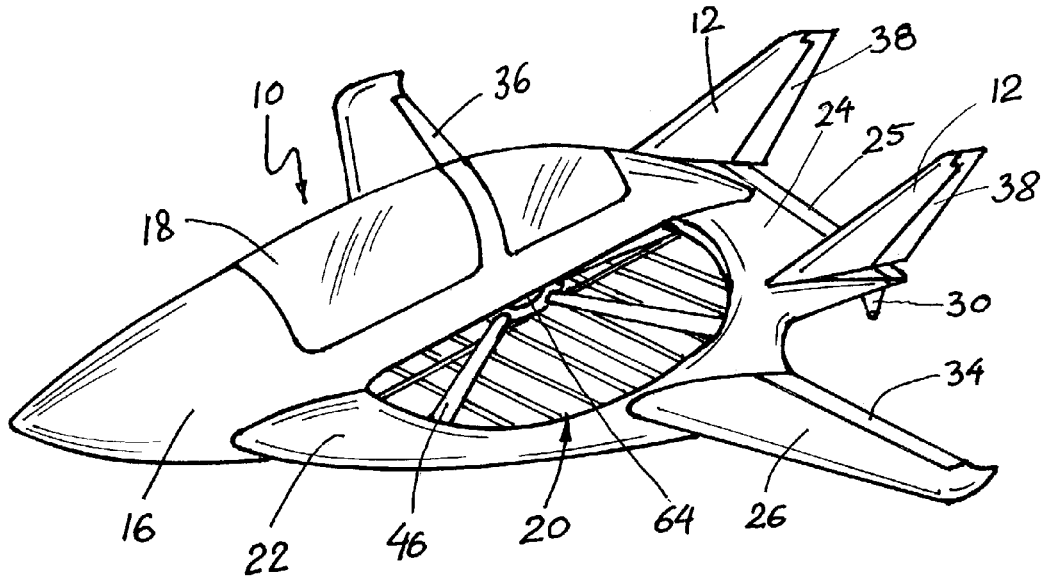
FIG. 1 is a perspective view of an aircraft in accordance with the present invention.

Referring to the drawings, and particularly the FIGS. 1 through 5, the aircraft 10 of the invention is illustrated. As used herein the term aircraft is meant to include any airborne vehicle. In the preferred embodiment, the aircraft 10 takes the form of a single engine 90 turbo shaft, or rotary (Wankel type) powered aircraft incorporating the fuselage 16 which houses a tandem cockpit with canopy 18 and 19. The fuselage 16 (and the cockpit) bridges over a ducted propeller assembly 20. The fuselage 16, or particularly the cockpit section, bridges directly over the axis of the propeller and tapers to a minimum cross-section to maximize air flow through the duct.

The ducted propeller assembly 20 incorporates a forward lifting airfoil shaped surface 22 and extends through an aft extension, which forms the tail lifting surface 24 which mounts an elevator 25 and a pair of vertical tail surfaces which incorporates a pair of rudders 38.

Span wise the forward lifting surface 22 terminates in wing extensions 26 and 28, which incorporates ailerons 34 and 36. The wing 26 and 28 are detachable, for easy storage and transportation.

As used herein the term propeller is intended to include any rotating blade mounted from a central hub 65 and operating at an angle of attack to the relative movement of air past the propeller. In the preferred embodiment, the propeller takes the form of a multi-bladed propeller. In this case the propeller hub 65 mounts five blades 46. The propeller blades are fixed in flight, but the pitch is adjustable on the ground when the engine is not running. This aircraft can also be equipped whit an in flight variable pitch propeller.

Figure 7:
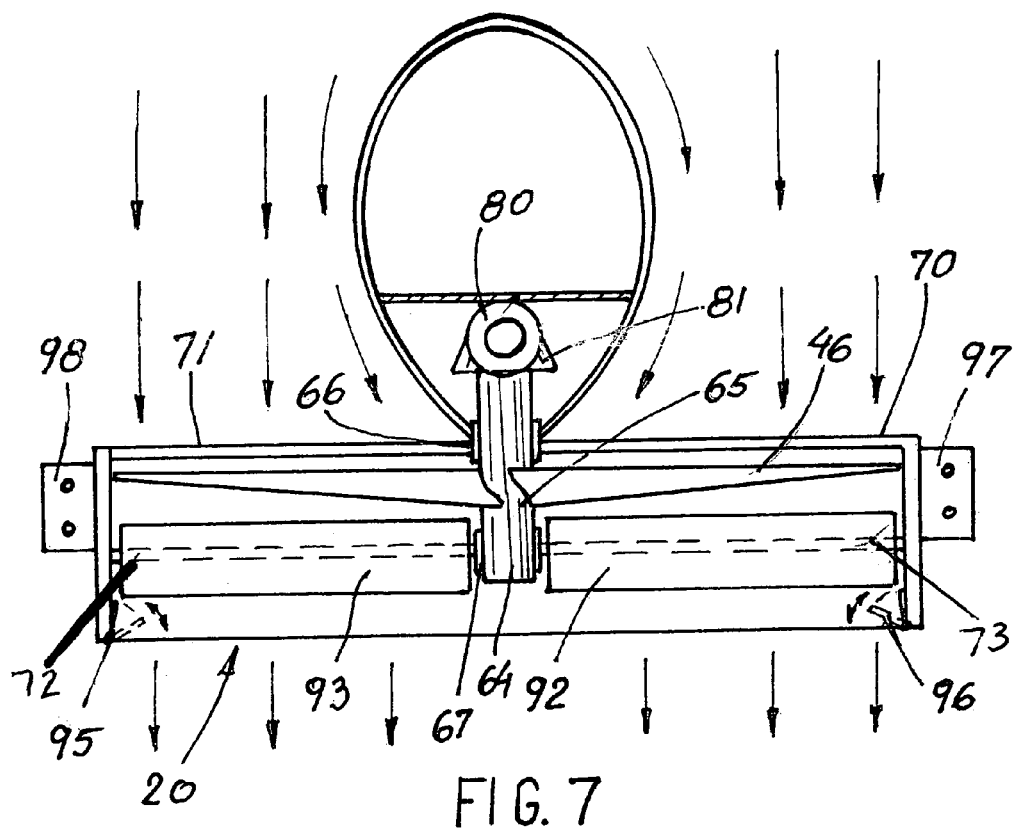
FIG. 7 is a cutaway cross sectional view of the fuselage at the point of bridging the ducted propeller assembly of the present invention taken of line 6-6 of FIG. 5.
Figure 8:
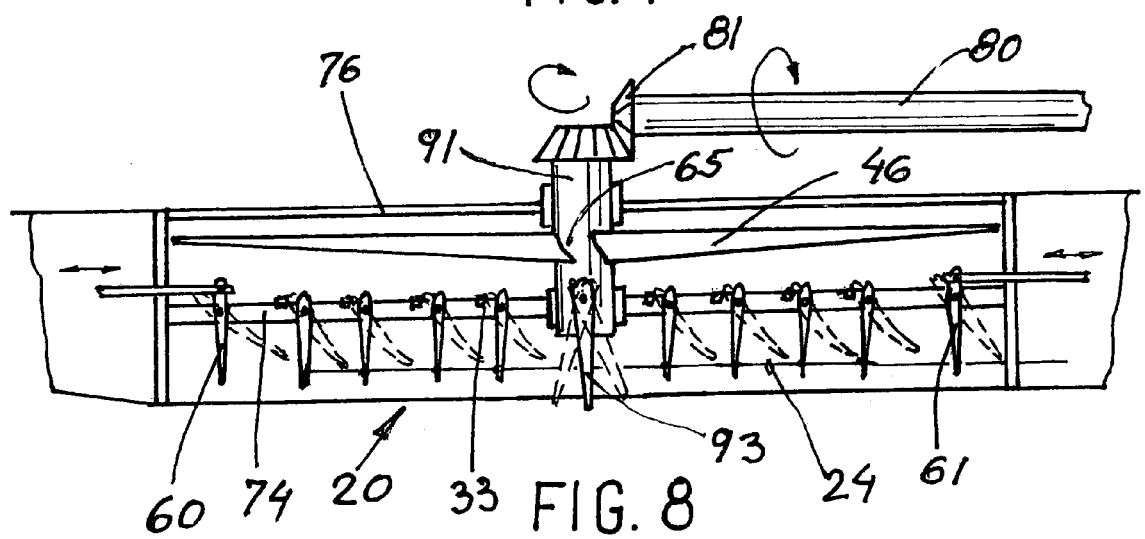
FIG. 8 is a cutaway cross sectional partial view of the fuselage along the longitudinal axis of the present invention taken of line 7-7 of FIG. 3.

Referring to FIG. 7 and FIG. 8 the propeller hub 65 is mounted on the propeller shaft 64 which is supported by the upper bearing 66 and lower bearing 67. The upper bearing 66 housing is mounted and supported by the longitudinal trailing edge 76 of the fuselage, 76 FIG. 8, and by the upper lateral spar 70 and 71, FIG. 7. The lower bearing 67 housing is supported by the lower longitudinal spar 74, FIG. 8 and by the lower lateral spars 72 and 73 FIG. 7.

Referring to FIG. 4, the aircraft is illustrated in horizontal flight. As used herein, the term aircraft related horizontal is intended to refer to horizontal line drawn through the aircraft in this flight mode.

As will appear in FIG. 4 in the horizontal flight mode, the whole aircraft and therefore the ducted propeller assembly 20 are inclined forward at an angle to the incoming air stream.

Therefore, the air exiting the ducted propeller assembly already has a substantial horizontal component due to the flight configuration of the aircraft itself.

The exiting air is redirected to fully horizontal thrust by a series of louvers 23, FIG. 4. The louvers 23 shown in phantom may be controlled to redirect the air exiting the fan in two principal modes, the vertical flight mode and the horizontal flight mode. In the horizontal flight mode, all of the louvers 23 redirect the air in the same direction (in this case, horizontally aft of the aircraft) resulting in substantial forward thrust.

Figure 3:
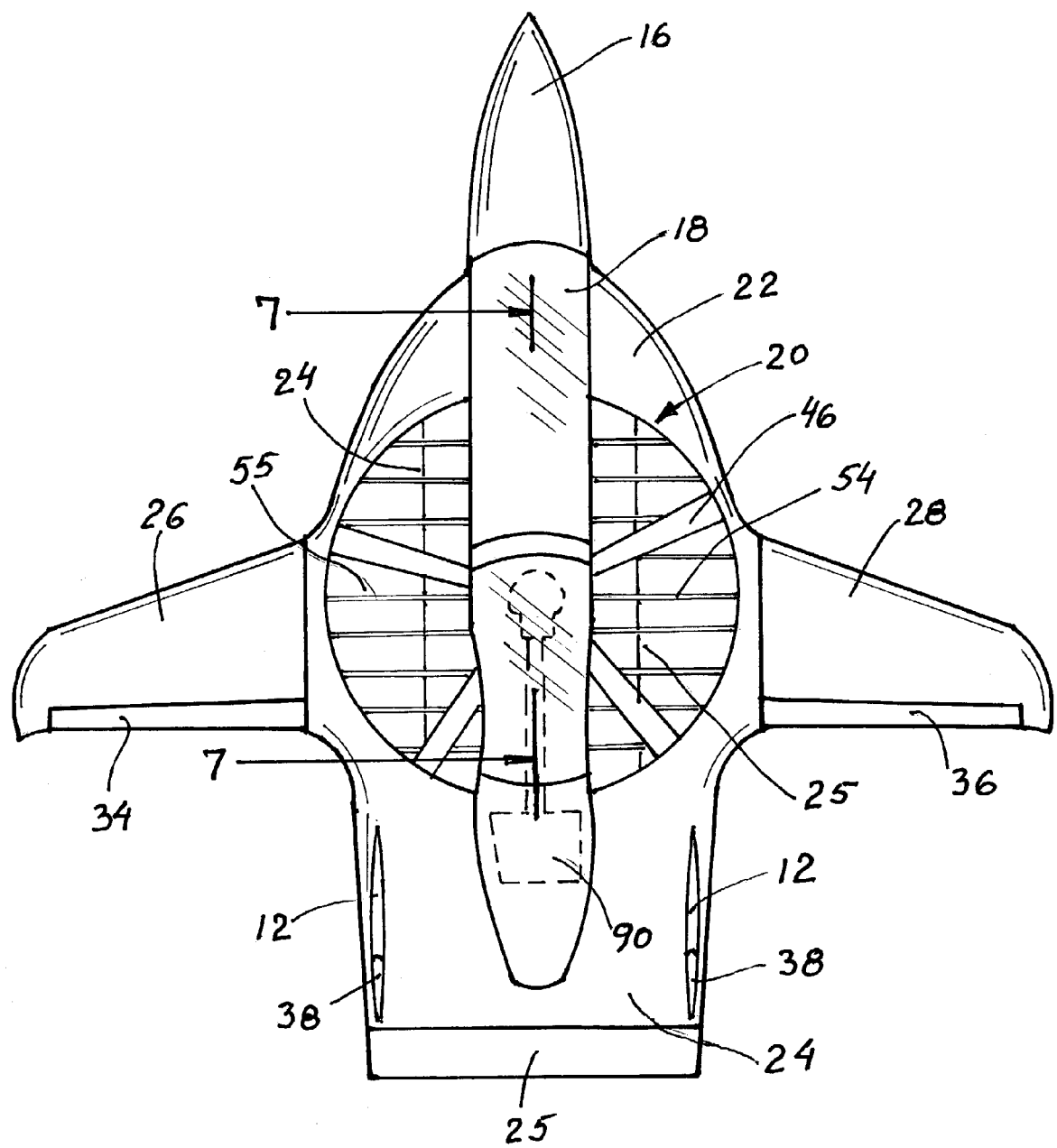
FIG. 3 is a top plan view of the present invention.

Louvers 23 are inter-connected by control rods 24 and 25, FIG. 3 and FIG. 8. As they are moved simultaneously they tilt the louvers forward until they reach the stopping blocks 33 FIG. 8. As the leading edges of louvers 23 press against the stopping blocks 33 and as the control rods 24 and 25 are connected to the trailing edges of the louvers they can further bend these flexible louvers so they create a curved surface, therefore, the air an exit in more horizontal aft direction, and the bending force will prevent the louvers from flutter or vibration.

The wing, in the horizontal flight mode, as will be most clearly appreciated from the end-on view of wing extension 26 on FIG. 4 operates at a small (wing air foil chord) positive angle of attack. FIG. 5 shows the operation of the aircraft in the vertical take off mode. During vertical touch down, the aircraft rests on the ground on a main landing gear 52 fully extended and the pair of tail wheels 30. The fully extended main landing gear 52 keeps the propeller 46 or the ducted propeller assembly 20 in a horizontal position during vertical take off and landing.

Figure 2:
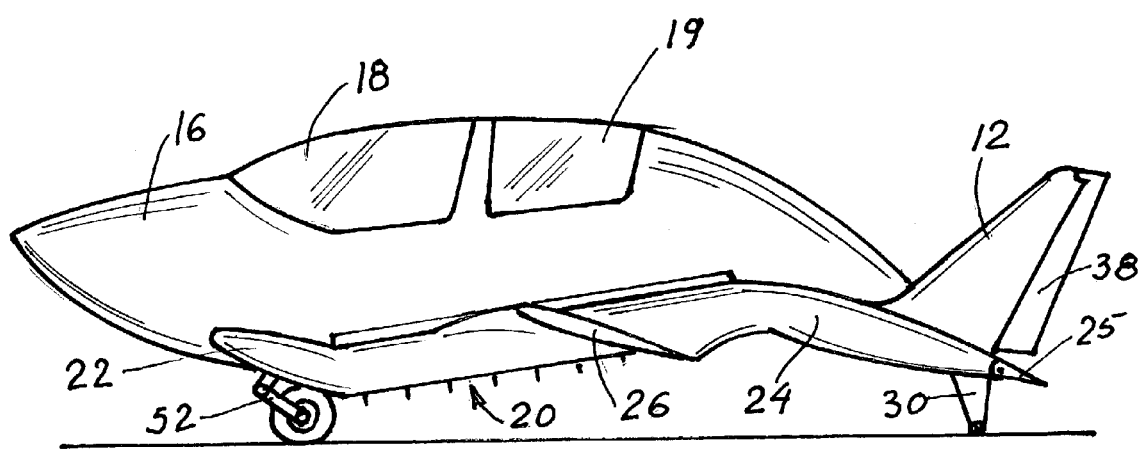
FIG. 2 is a side view showing the aircraft in taxi or short take-off position.

The main landing gear 52 can be selected in three positions:

1) Fully extended for vertical landing or take-off FIG. 5.
2) Partially extended for taxiing on the ground or for short take off FIG. 2 or in emergency in case of engine failure the aircraft can glide and land in a traditional manner on an airfield or on a sufficient flat surface with the main landing gear 52 selected in a partially extended position.
3) Fully retracted or high-speed horizontal flight as in FIG 4.

After the engine 90 is started and the propeller rotates, thrust is produced. The louvers 23 are arranged so that the thrust has a substantially vertical component (see FIG. 5). This thrust results in the use of engine power to lift the aircraft vertically.

The function of the louvers 23 in the vertical take off mode is to straighten the spiral motion of the downward moving air, created by the propeller 46. Straightening the exiting air will enhance the vertical thrust. At the same time as the spiraling air hits the louvers 23 it tends to create an opposite force to the torque reaction of the propeller, which will help to keep the nose of the aircraft 10 straight.

Figure 6:
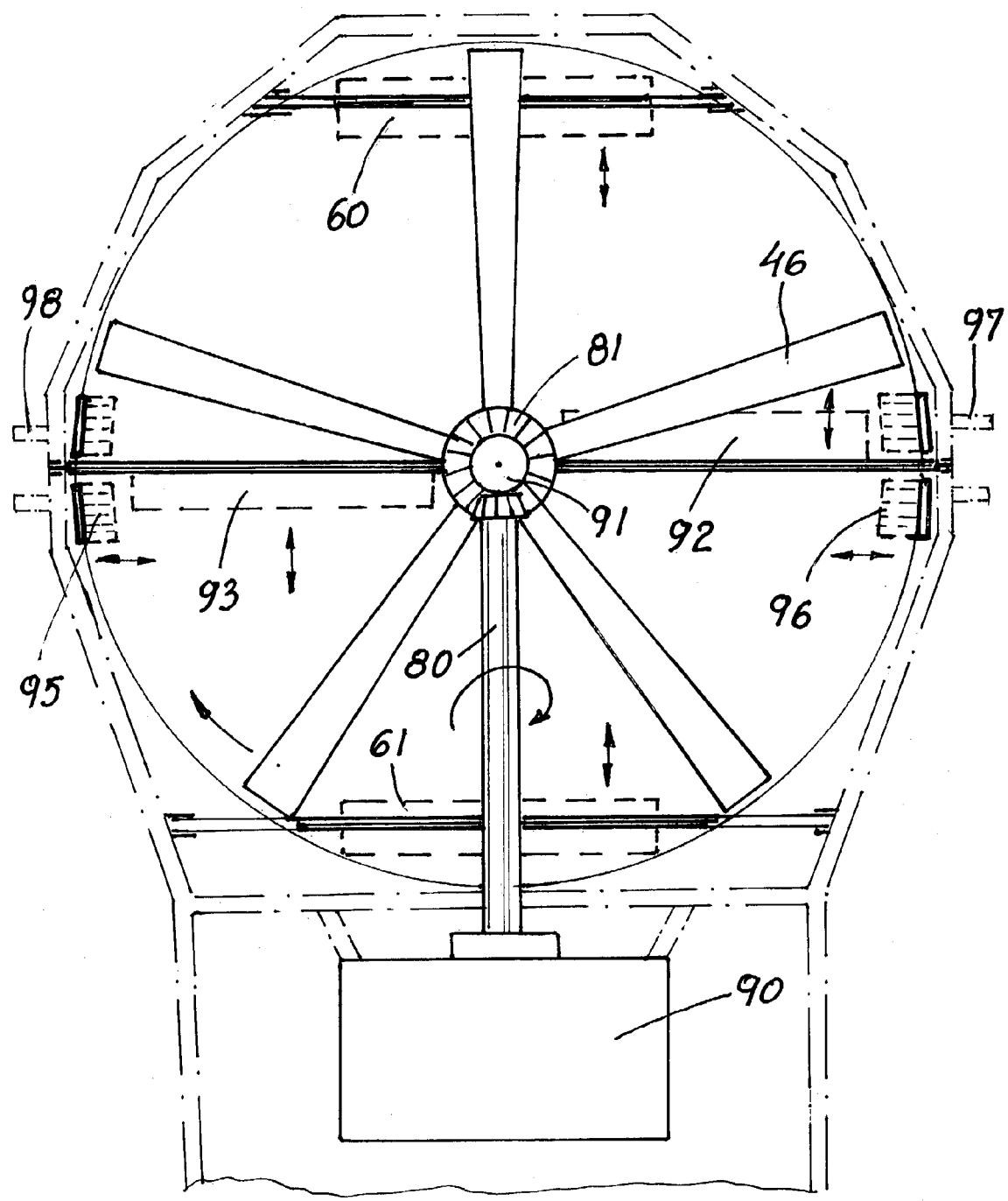
FIG. 6 is a top view of the ducted propeller thrust/lift assembly showing the relative location of the engine, the drive shaft, the bevel drive gear, the propeller shaft, the propeller blades, the left and right wing attachment points, and the control surfaces for hovering and vertical flight, where the dotted lines indicate the vertical flight control surfaces' movement.

The conventional control surfaces used in horizontal flight are ineffectual during vertical take off and landing, when the horizontal speed is zero or close to zero. During vertical flight or hovering, the aircraft 10 is controlled by means of varying the center of the thrust of the propeller disc, via the very front 60 or aft 61 control louvers, or left 95 or right 96 spoilers (see FIG. 6). All flight control surfaces are controlled from the cockpit by moving he control stick 35 and ruder pedals 39. The ailerons are connected to the bank control spoilers, the elevator is connected to the tilt control louvers, and the ruder is connected to the direction control louvers. Therefore the flight control surfaces which are controlling the aircraft in vertical flight mode, will be deployed simultaneously with the respective traditional wing born flight control surfaces, and vice versa.

FIG. 7 illustrates the way airflows over the symmetrical airfoil shaped cross section of fuselage 16 and through the ducted propeller assembly 20. The left 93 and the right 92 central louvers control the yaw, or direction, by moving them simultaneously in the opposite direction, respectively turning the nose of the aircraft 10 to the left or to the right. The deflection of these louvers creates a horizontal component of thrust around the central vertical axes of the aircraft 10.

Figure 9:
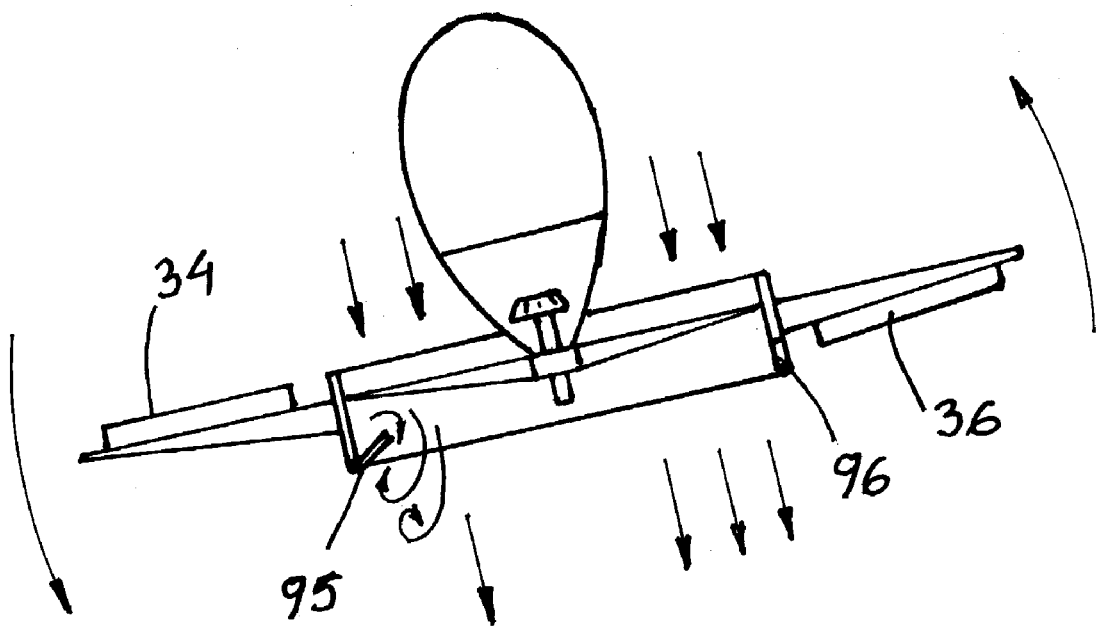
FIG. 9 is a cutaway cross sectional view of the present invention taken of line 6-6 of FIG. 5, and it shows the deployment of the spoiler for the roll control on the left side.

The left 95 and the right 96 spoilers are mounted into the sidewalls of the ducted propeller assembly 20, and below the propeller blades 46. When the aircraft 10 needs to be tilted or rolled to the left during vertical flight mode (see FIG. 9), the left spoiler 95 is deployed by moving the control stick 35 in the cockpit (see FIGS. 4 and 5) to the left which also simultaneously moves the left aileron 34 up and the right aileron 36 down (see FIG. 9).

Figure 10:
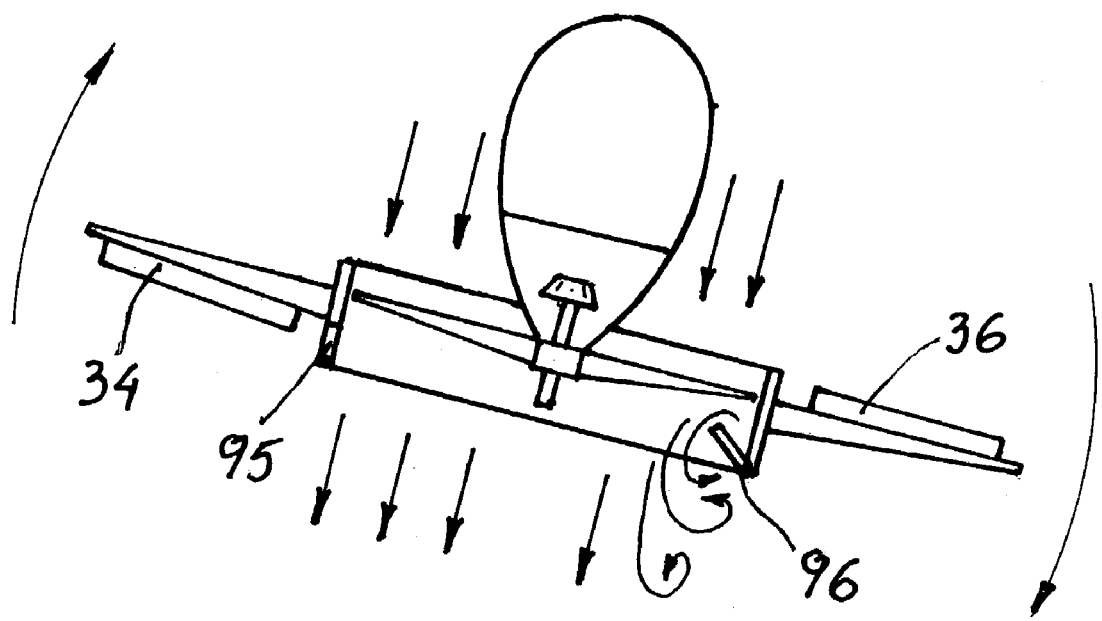
FIG. 10 is a cutaway cross-section view of the present invention taken of line 6-6 of FIG. 5. It shows the deployment of the spoiler for the roll control on the right side.

When the aircraft 10 needs to be tilted or rolled to the right during vertical flight mode, the right spoiler 96 is deployed by moving the control stick 35 to the right, and the right aileron 36 moves up and the left aileron 34 moves down (see FIG. 10)

FIG. 8 illustrates a partial cross section of the side view of the ducted propeller assembly. Drive shaft 80 is connected to the engine shaft and coupled to the bevel gear 81 and propeller shaft 91, which rotates the propeller 46.

When the aircraft 10 needs to be tilted or pitched forward during vertical flight, the front louver 60 is deployed by moving the control stick 35 forward, which simultaneously moves the elevator 25 down.

Figure 11:
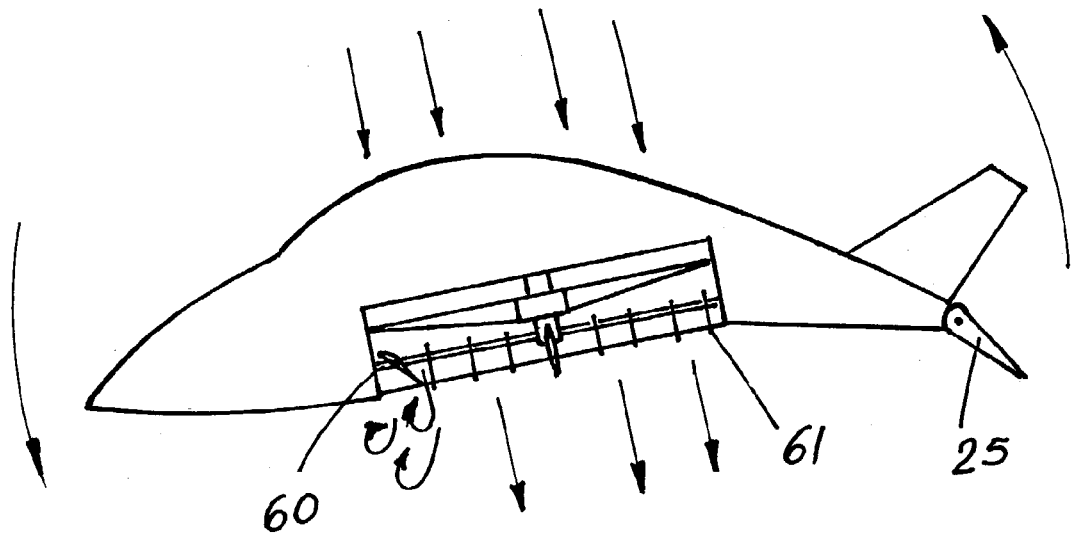
FIG. 11 is a cutaway cross sectional view of the present invention taken of line 7-7 of FIG. 3; it shows the deployment of the very front control louver (nose down pitch control for vertical flight).

The deployed louver 60 partially blocks the airflow thus reducing the thrust in the front area of the ducted propeller assembly, and subsequently shifting the center of thrust aft of the aircraft center of gravity. The resulting moment forces the aircraft to tilt forward (see FIG. 11)

Figure 12:
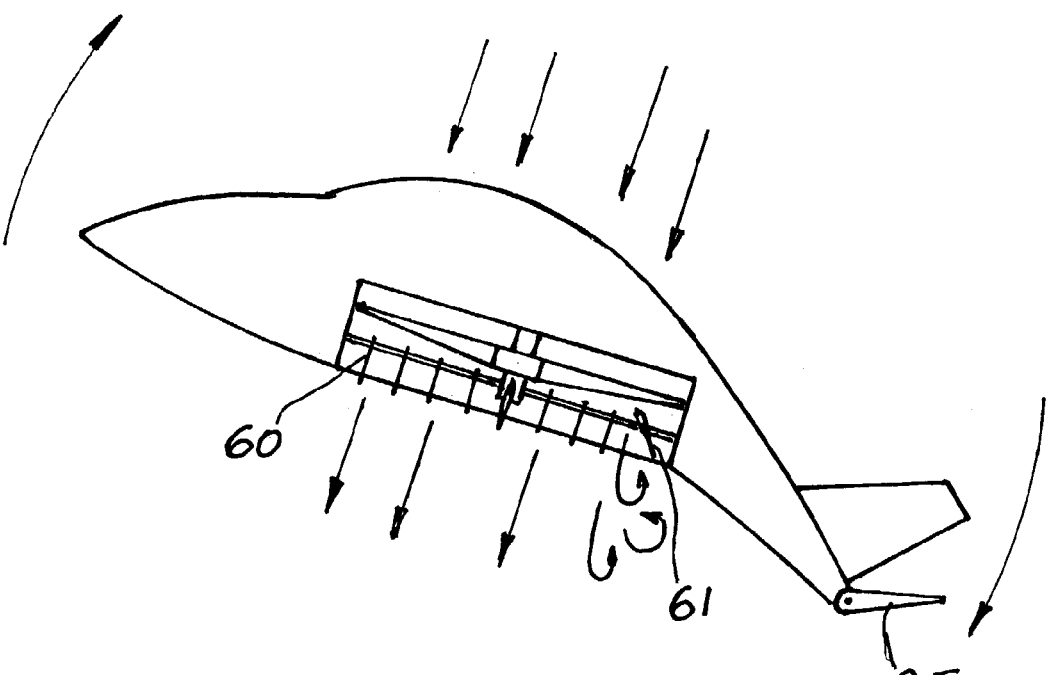
FIG. 12 is a cutaway cross sectional view of the present invention taken of line 7-7 FIG. 3, and it shows the deployment of the very aft control louver (nose up pitch control for vertical flight).

When the aircraft 10 needs to be tilted or rotated backward, during vertical flight the aft louver 61 is deployed by moving the control stick 35 in the cockpit aft, which simultaneously moves the elevator 25 up, creating a momentum along the aircraft longitudinal axis, and rotating the nose of the aircraft up, around the lateral axis (see FIG. 12). The throttle is active in vertical and horizontal flight modes to control the output of the engine 70, therefore controlling the rate of climb or descent.

Figure 13:
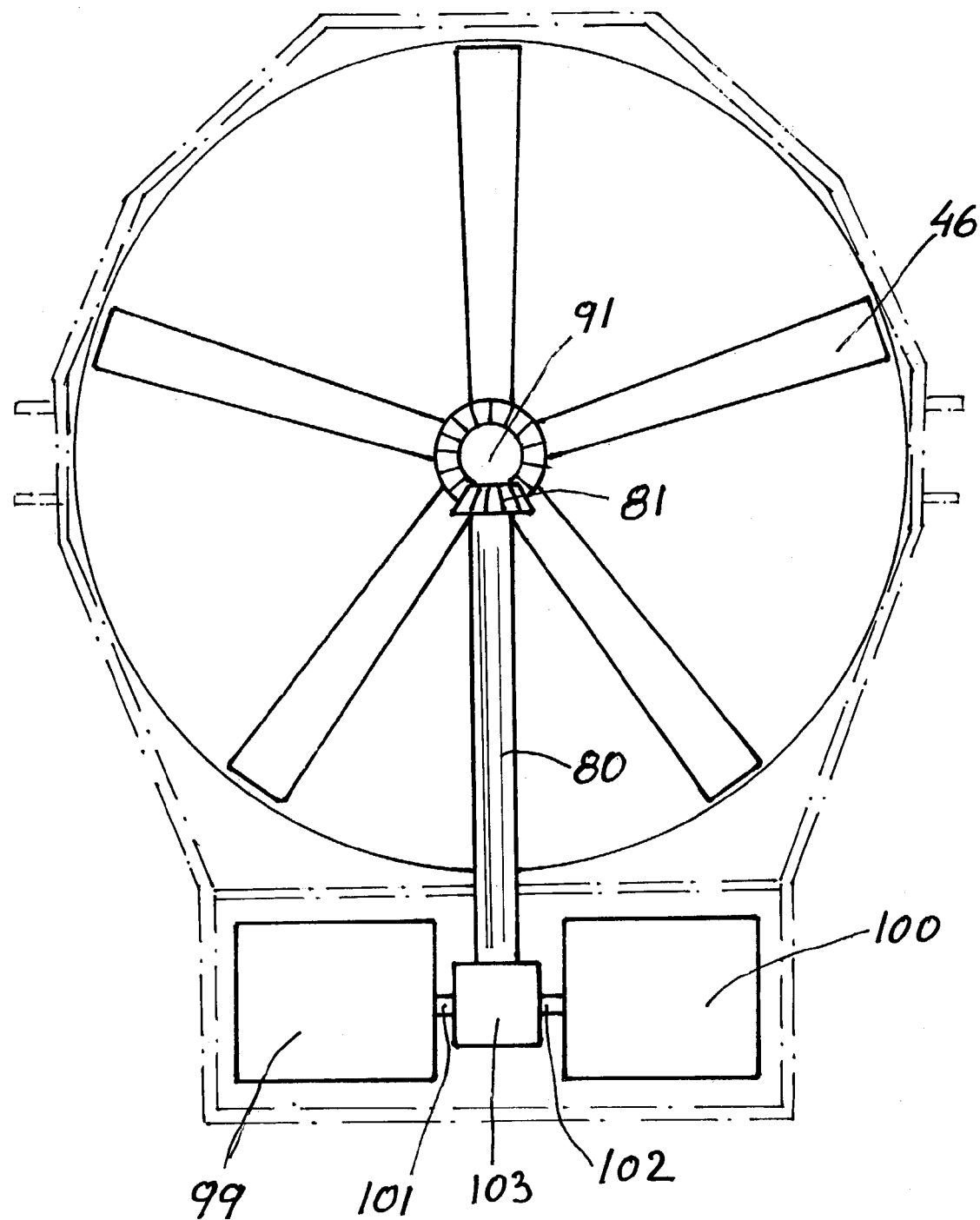
FIG. 13 is a top view of the ducted propeller thrust/lift assembly showing the relative location of the engines, when the present invention is equipped with two engines.

If the aircraft 10 is equipped with two engines illustrated on FIG. 13, the left engine 99 having a drive shaft 101 is connected to the centrally located gear box 103. The right engine 100 having a drive shaft 102 is connected from the right to the gearbox 103, which is centrally located between the two engines The output shaft 80 runs centrally from the gearbox 103 to the bevel gear 81 and to the propeller shaft 91, which rotates the propeller 46.

Having described my invention, I now claim:

1. An aircraft equipped with only a single propeller and only a single duct, capable of short or vertical take-off and landing (S/VTOL) as well as an efficient horizontal cruise mode comprising:
    a fuselage or cabin section where said fuselage transverse cross section has a symmetrical air foil shape where the sharp edge forms the bottom of the fuselage and is attached to the top section of said single duct;
    a propulsion assembly comprising a single propeller installed horizontally inside the single duct, said propeller having a propeller shaft, where said shaft is mounted vertically into the bottom of said fuselage, via bearings and bearing housing, where the aircraft center of gravity is located;
    a pair of wings mounted on opposing lateral sides of said single duct, said wings having left and right ailerons for roll control during horizontal flight;
    an aft extension of said single duct forming a tail surface, which supports an elevator to control the pitch during horizontal flight, said tail surface also supports at least one vertical tail surface to provide for directional stability and to control yaw during horizontal flight;
    a set of landing gears one installed in the front section of said fuselage, and a pair of gears installed in the rear section of said tail surface.

2. The S/VTOL aircraft of claim 1 further comprising a plurality of louvers installed span wise inside said single duct in the propeller slipstream for redirecting the exiting airflow, said louvers are operable simultaneously to redirect substantially all thrust in an aft ward airframe referenced generally horizontal direction during horizontal flight to improve the horizontal speed.

3. The S/VTOL aircraft of claim 2 wherein said louvers are interconnected by control rods, said control rods being attached perpendicularly to the trailing edge of said louvers, and being operated simultaneously, said louvers having an airfoil shape in cross section, having a chord vertically oriented in a vertical take-off and lading mode, said louvers being pivoted around a longitudinal axis via bearings mounted in said single duct.

4. The S/VTOL aircraft of claim 3 wherein said pivoting louvers have a range of movement approximately 30 degrees and have a vertical position in a vertical flight mode, said louvers reach their maximum tilting range and are stopped by stopping blocks installed on the walls of said duct.

5. The S/VTOL aircraft of claim 4 wherein said pivoting louvers reach said stopping blocks in the horizontal flight mode, said louvers are constructed in a way that they can be further bent to the point where they direct the airflow exiting said louvers in aft ward horizontal direction to achieve a smooth airflow therefore the thrust created by the propeller will have mainly horizontal components for high speed flight.

6. The S/VTOL aircraft of claim 1 wherein said propulsion assembly incorporating a single propeller further comprising at least one engine having an output shaft connected to a beveled gear assembly, and said propeller shaft for powering said propeller to produce thrust.

7. The S/VTOL aircraft of claim 1 further comprising a control system to control and stabilize the single propeller and single duct aircraft during hover and transition flight; said control system comprising;
    at least one control louver mounted in the front section of said single duct, operating in the propeller slipstream said control louver is mechanically connected to said elevator via push-pull rods to produce nose down pitch, by pivoting forward, and therefore creating turbulence and down force on the front section of said single duct;
    a control louver mounted in the rear section of said single duct, operating in the propeller slipstream, said control louver is mechanically connected to said elevator via push-pull rods to produce tail down pitch, by pivoting aft ward, and therefore creating turbulence and down force on the rear section of said single duct;
    a left control spoiler mounted on the left side of said single duct operating in the propeller slip stream said left control spoiler is mechanically connected to the left aileron via push-pull rods to produce roll by pivoting, and therefore creating turbulence and left down force on said single duct, rolling the aircraft to the left;

a right control spoiler mounted on the right side of said single duct operating in the propeller slipstream, said right control spoiler is mechanically connected to the right aileron via push-pull rods to produce roll by pivoting, and therefore creating turbulence and right down force on said single duct, rolling the aircraft to the right;

a pair of control louvers running diagonally through the central section of said single duct operating in the propeller slipstream where said control louvers are separated at the propeller shaft to form a left control louver and a right control louver, where said left control louver is pivoting to create a component of forward thrust, and at the same time a right control louver is pivoting to create a component of rearward thrust, therefore making the aircraft yaw to the left, or if the pivoting of said control louvers is reversed the aircraft will yaw to the right.

\* \* \* \* \*